US011586281B2

(12) United States Patent
Ratcliff et al.

(10) Patent No.: US 11,586,281 B2
(45) Date of Patent: Feb. 21, 2023

(54) METHOD, COMPUTER PROGRAM AND HEAD MOUNTABLE ARRANGEMENT FOR ASSISTING A SUBJECT TO ACQUIRE SPATIAL INFORMATION ABOUT AN ENVIRONMENT

(71) Applicant: Tobii AB, Danderyd (SE)

(72) Inventors: Andrew Ratcliff, Danderyd (SE); Daniel Tornéus, Danderyd (SE); Eli Lundberg, Danderyd (SE); Henrik Andersson, Danderyd (SE)

(73) Assignee: TOBII AB, Danderyd (SE)

( * ) Notice: Subject to any disclaimer, the term of this patent is extended or adjusted under 35 U.S.C. 154(b) by 0 days.

(21) Appl. No.: 16/795,123

(22) Filed: Feb. 19, 2020

(65) Prior Publication Data

US 2020/0387221 A1     Dec. 10, 2020

(30) Foreign Application Priority Data

Feb. 19, 2019   (SE) .................................. 1950209-5

(51) Int. Cl.
*G06F 3/01*        (2006.01)
*G02B 27/00*       (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .............. G01B 11/026; G02B 27/0093; G02B 27/0172; G02B 2027/0178; G02B 27/017;
(Continued)

(56) References Cited

U.S. PATENT DOCUMENTS

2007/0041600 A1   2/2007 Zachman
2008/0088469 A1   4/2008 Doemens et al.
(Continued)

FOREIGN PATENT DOCUMENTS

CN   108351522 A   7/2018
JP       549488 A   1/1979
(Continued)

OTHER PUBLICATIONS

CN202010090696.7, "Office Action", dated Apr. 28, 2022, 10 pages.
(Continued)

*Primary Examiner* — Nelson M Rosario
(74) *Attorney, Agent, or Firm* — Kilpatrick Townsend & Stockton LLP

(57) ABSTRACT

A head mountable arrangement assists a subject to acquire spatial information about a surrounding environment by receiving gaze data from an eyetracker and spatial data from a distance sensor respectively. The gaze data describe an estimated point of regard of the subject, and the spatial data describe a distance between a reference point and an object in the surrounding environment. A feedback signal is provided, which indicates a distance from the subject to said object in the surrounding environment. The feedback signal is generated based on the estimated point of regard and the spatial data, and may reflect the distance to a surface element of an object that intersects a straight line between an eye-base line of the subject and the estimated point of regard, which surface element is located closer to the eye-base line than any other surface element of the objects in the surrounding environment along said straight line.

16 Claims, 3 Drawing Sheets

(51) Int. Cl.
*G02B 27/01* (2006.01)
*G06F 3/16* (2006.01)
*G06V 20/20* (2022.01)

(52) U.S. Cl.
CPC .............. *G06F 3/016* (2013.01); *G06F 3/167* (2013.01); *G06V 20/20* (2022.01)

(58) Field of Classification Search
CPC ...... G02B 2027/014; G02B 2027/0187; G06F 3/011; G06F 3/013; G06F 3/016; G06F 3/167; G06F 1/163; G06F 3/017; G06F 3/04815; G06F 3/0482; G06F 3/04842; G06K 9/00671; G06T 7/70; H04N 13/344; H04N 13/383
See application file for complete search history.

(56) References Cited

U.S. PATENT DOCUMENTS

| 2014/0184496 A1* | 7/2014 | Gribetz | G06F 3/011 345/156 |
| 2015/0035744 A1 | 2/2015 | Robbins et al. | |
| 2016/0048019 A1 | 2/2016 | Haddick et al. | |
| 2016/0054837 A1 | 2/2016 | Stafford | |
| 2016/0267708 A1 | 9/2016 | Nistico et al. | |
| 2018/0101223 A1 | 4/2018 | Ishihara et al. | |
| 2018/0299952 A1* | 10/2018 | Koker | G06T 7/80 |
| 2020/0117270 A1* | 4/2020 | Gibson | G06F 3/012 |

FOREIGN PATENT DOCUMENTS

| RO | 130467 A2 | 8/2015 |
| RO | 130945 A2 | 2/2016 |
| WO | 2016110804 A1 | 7/2016 |
| WO | 2016131793 A1 | 8/2016 |
| WO | 2017149526 A2 | 9/2017 |

OTHER PUBLICATIONS

EP20158207.9, "Extended European Search Report", dated Jun. 23, 2020, 7 pages.
SE1950209-5, "Search Report", dated Oct. 4, 2019, 3 pages.

* cited by examiner

METHOD, COMPUTER PROGRAM AND HEAD MOUNTABLE ARRANGEMENT FOR ASSISTING A SUBJECT TO ACQUIRE SPATIAL INFORMATION ABOUT AN ENVIRONMENT

CROSS-REFERENCES TO RELATED APPLICATIONS

This application claims priority to Swedish Application No. 1950209-5, filed Feb. 19, 2019; the content of which are hereby incorporated by reference.

TECHNICAL FIELD

The invention relates generally to automatic amplification of visual impressions of spatial relationships. In particular, the present invention concerns a method for assisting a subject to acquire spatial information about a surrounding environment, a processing circuitry for performing this method and a head mountable arrangement containing the proposed processing circuitry. The invention also relates to a computer program product and a non-volatile data carrier.

BACKGROUND

Eye/gaze tracking is the process of measuring the motion and/or positioning of an eye relative to the head, or the point of gaze. An eyetracker is a device for measuring eye positions and eye movement. Eyetrackers are used in many different applications.

There are various methods for measuring eye movement. The most popular variant uses video images from which the eye position is extracted. Other methods use search coils, or are based on the electrooculogram. Originally, eyetracking technology was used in research on the visual system, in psychology, in psycholinguistics, marketing and in product design. Today, we see an increasing use of eyetrackers as input devices for human-computer interaction in various kinds of devices and apparatuses from smartphones to aircrafts. Many times, an eyetracker is an efficient means of interaction for a person who has reduced ability to speak and/or is unable to enter computer commands via conventional interfaces.

US 9,185,352 describes systems and methods that relate to a user providing input to a computing device using eye tracking from a mobile position. Here, a scene camera is mounted to the user so that the system collects image information related to where the user is looking. An indication is provided on a monitor of the computing device, or other field of view, to signify the presence and location of an identifying region of the monitor or field of view. An eye camera mounted to the user collects image information of the user's eye relating to a direction of gaze of the eye. When the direction of gaze of the user's tracked eye intersects the identifying region of the monitor or field of view, suitable eye tracking methods for controlling a computing device may be used to send instructions to the computing device.

US 2015/0049012 shows a method, an apparatus and a computer program product that provide feedback to a user of an augmented reality (AR) device having an optical see-through head mounted display (HMD). The apparatus obtains a location on the HMD corresponding to a user interaction with an object displayed on the HMD. The object may be an icon on the HMD and the user interaction may be an attempt by the user to select the icon through an eye gaze or gesture. The apparatus determines whether a spatial relationship between the location of user interaction and the object satisfies a criterion, and outputs a sensory indication, e.g., visual display, sound, vibration, when the criterion is satisfied. The apparatus may be configured to output a sensory indication when user interaction is successful, e.g., the icon was selected. Alternatively, the apparatus may be configured to output a sensory indication when the user interaction fails.

Thus, different technical solutions exist that identify a user's point of regard and provide feedback in the form of visual display, sound and vibration regarding the user's interaction with an apparatus.

SUMMARY

However, there is yet no efficient means of aiding a user's sense of sight to gain enhanced spatial knowledge about the general environment surrounding the user.

One object of the present invention is therefore to offer a solution that enables a subject to acquire spatial information about a surrounding environment by using the subject's own ocular activity to attain more details than the subject's eyes themselves can provide.

According to one aspect of the invention, this object is achieved by a method performed in a processing circuitry, which method involves receiving gaze data describing an estimated point of regard of the subject. The method involves receiving spatial data describing a distance between a reference point and an object in the surrounding environment; and generating a feedback signal for presentation to the subject, where the feedback signal is generated based on the estimated point of regard and the spatial data. The feedback signal indicates a distance from the subject to the object in the surrounding environment.

This method is advantageous because it enables amplification of various visual stimuli and/or replacing visual stimuli with one or more other sensory stimulus, for instance relating to hearing and/or touch. Consequently, people with any degree of visual capacity, i.e. ranging from being completely blind to having perfect eyesight, can gain enhanced spatial information about their environment in a robust and reliable manner.

According to one embodiment of this aspect of the invention, feedback signal also indicates a movement of the object relative to the subject. For instance, an approaching object may be indicated in a first manner, while a stationary object may be indicated in a second manner. Of course, a departing object may be indicated in yet a third manner. Thereby, the user can identify and avoid potentially harmful objects in his/her environment.

The feedback signal is preferably configured to cause at least one first sensory stimulus to be applied to the subject in the form of an acoustic signal, a haptic signal and/or a visual signal. Thus, the subject may "regard" his/her surrounding environment via sound cues and/or a haptic actuator (e.g. a wristband) in addition to, or as a supplement to his/her own visual impressions.

According to another embodiment of this aspect of the invention, an intensity of the at least one first sensory stimulus reflects a distance to a first surface element of an object that intersects a straight line between an eye-base line of the subject and the estimated point of regard. Here, the first surface element is located closer to the eye-base line than any other surface element of objects in the surrounding environment along said straight line. Preferably, the intensity of the feedback signal is relatively high for a comparatively short distance, and vice versa. This means that the estimated point of regard "sees" the object that is located closest to the subject. In other words, normal vision is mimicked in a natural and intuitive manner.

According to further embodiments of this aspect of the invention, the reference point is either located on the eye-base line, or at a geometric center of a head mountable arrangement worn by the subject. The former is straightforward to implement. In the latter case, the head mountable arrangement is presumed to incorporate an eyetracker that generates the gaze data. The geometric center represents an estimated point around which the head mountable arrangement is rotated when mounted on the subject. This, in turn, provides a good and consistent user experience.

According to yet another embodiment of this aspect of the invention, in addition to or as an alternative to distance information, the spatial data describes color and light intensity information reflected from at least one object in the surrounding environment. The method involves obtaining at least one visual quality of at least one of said at least one object from the spatial data; and generating the feedback signal such that it reflects said at least one visual quality. Thus, for example, the at least one visual quality may represent a color, a surface texture and/or an object class describing the object. The feedback signal may be configured to cause at least one second sensory stimulus to be applied to the subject, which reflects the color, the surface texture and/or the object class, and is different from the at least one first stimulus. Consequently, for example in parallel with a tactile feedback indicating distance, the subject may hear an audio signal saying "green book." Of course, for a visually impaired person, this is highly useful information.

According to still another embodiment of this aspect of the invention, generating the feedback signal involves presenting a visual signal to the subject in the form of an ocular cue confirming a position for the estimated point of regard at a particular object in the surrounding environment. The ocular cue is represented by at least one graphical element being shown in a field of view for the subject at such a position that the at least one graphical element superimposes the estimated point of regard. Hence, a seeing person can be efficiently guided through a scene even if he/she has very poor vision.

In addition to, or as an alternative, the method may involve presenting an acoustic signal to the subject, which acoustic signal provides a sound cue confirming a position for the estimated point of regard at a particular object in the surrounding environment. Here, the sound cue simulates an acoustic source being located at the estimated point of regard via three-dimensional positional audio effects. Thus, the subject will "hear" the object that he/she is looking at. For a blind person, or someone with a severe visual impairment, this gives very good guidance when orienting him-/herself in an area.

According to a further aspect of the invention the object is achieved by a computer program containing instructions which, when executed in a processing circuitry, cause the processing circuitry to carry out the above-described method.

According to another aspect of the invention, the object is achieved by a non-volatile data carrier containing such a computer program.

According to yet another aspect of the invention, the above object is achieved by a processing circuitry configured to be included in a head mountable arrangement for assisting a subject to acquire spatial information about a surrounding environment. The processing circuitry contains first and second input interfaces and an output interface.

The first input interface is configured to receive gaze data from an eyetracker, which gaze data describe an estimated point of regard of the subject. The second input interface is configured to receive spatial data describing a distance between a reference point and an object in the surrounding environment. The output interface is configured to provide a feedback signal indicating a distance from the subject to the object in the surrounding environment. The feedback signal is generated based on the estimated point of regard and the spatial data. The advantages of this processing circuitry, as well as the preferred embodiments thereof, are apparent from the discussion above with reference to the above method.

According to yet another aspect of the invention, the above object is achieved by a head mountable arrangement containing the proposed processing circuitry, an eyetracker, a distance sensor, and at least one feedback unit. The eyetracker is configured to generate gaze data describing an estimated point of regard of a subject wearing the head mountable arrangement. The distance sensor, e.g. including a 3D camera, is configured to generate spatial data describing a distance between a reference point and an object in a surrounding environment. The at least one feedback unit is configured to present a feedback signal to the subject, which feedback signal is generated based on the estimated point of regard and the spatial data. The feedback signal indicates a distance from the subject to the object in the surrounding environment. The advantages of this head mountable arrangement, as well as the preferred embodiments thereof, are apparent from the discussion above with reference to the above method.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
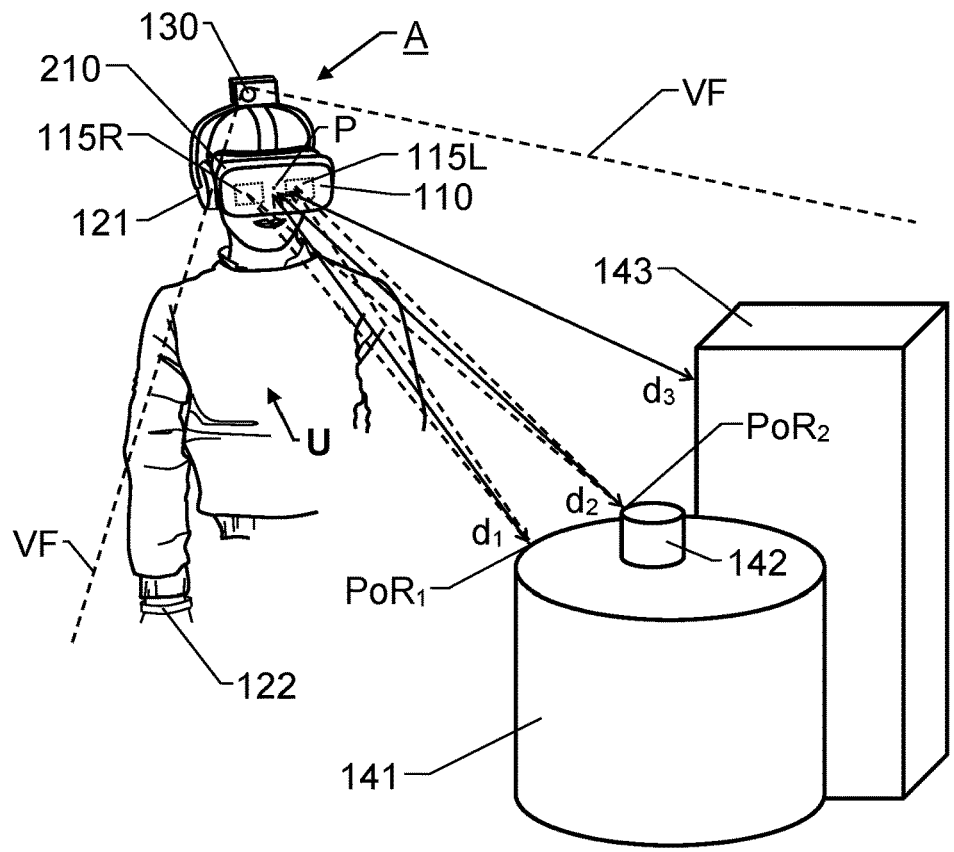
FIG. 1 illustrates, by an example, how a subject may employ a head mounted arrangement to acquire information about a surrounding environment according to one embodiment of the invention.

FIG. 1 shows how a subject U may employ a head mounted arrangement A to acquire information about a surrounding environment according to one embodiment of the invention.

The head mountable arrangement A contains a processing circuitry 210, an eyetracker 110, a distance sensor 130 and one or more feedback units 115R, 115L, 121 and 122 respectively.

The eyetracker 110 is configured to generate gaze data describing an estimated point of regard of the subject U who is wearing the head mountable arrangement A. In FIG. 1, the estimated point of regard is exemplified by a first gaze point $PoR_1$ on a first object 141 and a second gaze point $PoR_2$ respectively on a second object 142. The eyetracker 110 preferably uses video-image based technology to determine the subject's U eye positions and estimated point of regard. However, according to the invention, any alternative eyetracker technology is applicable, for instance being based on search coils, electrooculography or ultrasound measurements.

The distance sensor 130 is configured to generate spatial data describing respective distances between a reference point and at least one object within a view field/detection range VF in an environment surrounding the subject U. Thus, the distance sensor 130 may include a depth mapping camera, such as a TOF (time of flight) camera or a 3D camera, e.g. using stereo triangulation/stereo or photogrammetry, a structured-light 3D scanner, a laser rangefinder, an acoustic range finder (e.g. using ultrasound) and/or a radar to obtain depth data. FIG. 1 illustrates three distances d1, $d_2$ and d3 between a reference point P an eye-base line of the subject U and first, second and third objects 141, 142 and 143 respectively. Here, the first distance $d_1$ also represents the distance to a first gaze point $PoR_1$; and, analogously, the second distance $d_2$ represents the distance to a second gaze point $PoR_2$. According to the invention, the reference point P may be any well-defined position in relation to the distance sensor 130, for example a geometric center of the head mountable arrangement A. Such a reference point P is generally advantageous because it represents an estimated point around which the head mountable arrangement A is rotated when the subject U moves his/her head, i.e. looks sideways and/or up/down.

Each of the at least one feedback unit is configured to present a feedback signal to the subject U. The feedback signal is generated based on the estimated point of regard, e.g. $PoR_1$ or $PoR_2$, and the spatial data produced by the distance sensor 130. The feedback signal indicates a distance from the subject U to a particular object, e.g. 141 or 142, of the objects surrounding the subject U. Examples of appropriate feedback units are displays, e.g. in the form of an HMD (head/helmet mounted display) or EVFs (electronic viewfinders), either as a common unit for both eyes, or as separate units for each respective eye 115R and 115L. Alternatively, or in addition to such a display, the feedback unit may be represented by one or more headphones/earphone pieces 121 and/or haptic actuators, e.g. in the form of a haptic wristband 122 and/or an electronic braille board.

According to one embodiment of the invention, the feedback signal also indicates a movement of the object relative to the subject U. The movement, in turn, may be expressed in terms of velocity and direction. This means that an approaching object can be indicated in a first manner, while a stationary object can be indicated in a second manner and/or a departing object can be indicated in a third manner. Further, the object's velocity is preferably reflected by a magnitude of the feedback signal. Thereby, the user U can be aided to identify and avoid potentially harmful objects in his/her environment.

Figure 2:
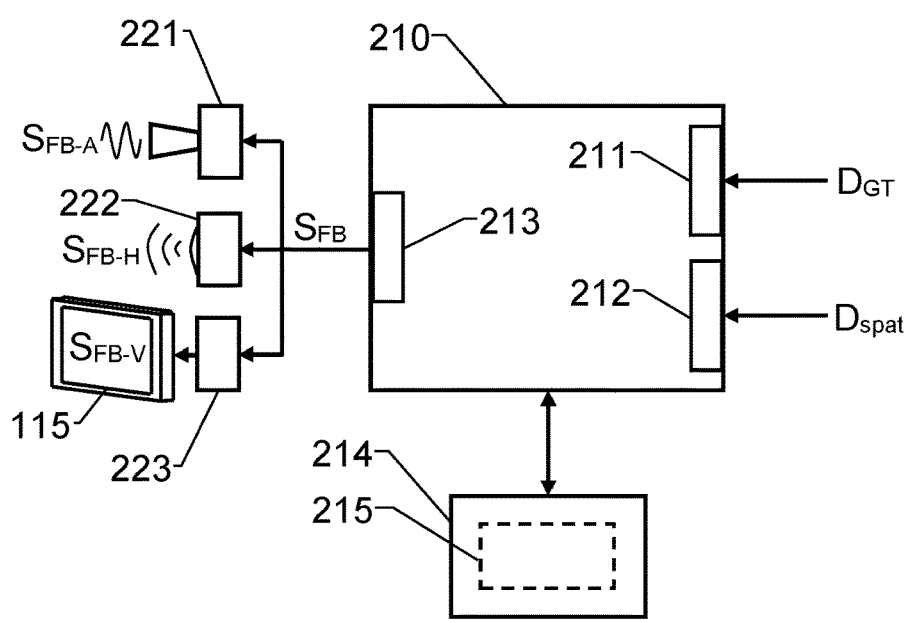
FIG. 2 shows a block diagram over a processing circuitry and a set of feedback interfaces according to one embodiment of the invention.

Referring now to FIG. 2, we see a block diagram over the processing circuitry 210. FIG. 2 also shows a set of exemplifying feedback drivers 221, 222 and 223 respectively and a data carrier 214 containing computer-executable instructions embodying a computer program 215. The data carrier 214 may either be included in the processing circuitry 210, or be communicatively connected thereto (as shown in FIG. 2). In any case, the data carrier 214 is a computer-readable storage medium, such as a Random Access Memory (RAM), a Flash memory, or the like, and the computer program 215 is configured to cause the processing circuitry 210 to perform in accordance with the embodiments of the invention as described herein, when the computer-executable instructions are executed in the processing circuitry 210. The processing circuitry 210 may for example include one or more general-purpose processors. The processing circuitry 210 also contains a first input interface 211, a second input interface 212 and an output interface 213.

The first input interface 211 is configured to receive the gaze data $D_{GT}$ from the eyetracker 110. The gaze data $D_{GT}$ describe an estimated point of regard, e.g. $PoR_1$ or $PoR_2$, of the subject U. The second input interface 212 is configured to receive the spatial data $D_{spat}$ from the distance sensor 130. The spatial data $D_{spat}$ describe at least one distance, e.g. $d_1$ and $d_2$, between the reference point P and at least one object, e.g. 141 and 142, in the surrounding environment. The output interface 213 is configured to provide the feedback signal $S_{FB}$ that indicates the distance from the subject U to one of said objects, e.g. 141 or 142. The feedback signal $S_{FB}$ is generated based on the estimated point of regard, e.g. $PoR_1$ or $PoR_2$, and the spatial data $D_{spat}$.

The processing circuitry 210 is configured to control the overall functioning of the head mountable arrangement A in such a manner that the subject U is assisted to acquire spatial information about an environment surrounding the subject U. Inter alia, according to one embodiment of the invention, this means that the processing circuitry 210 controls the output interface 213 to generate the feedback signal $S_{FB}$ to cause at least one first sensory stimulus to be applied to the subject U. The at least one first sensory stimulus, in turn, may be in the form of an acoustic signal $S_{FB-A}$, a haptic signal $S_{FB-H}$ and/or a visual signal $S_{FB-V}$. Specifically, a first feedback driver 221 may be configured to generate the acoustic signal $S_{FB-A}$ for presentation via a speaker, a headphone and/or an earpiece, e.g. 121; a second feed-back driver 222 may be configured to generate the haptic signal $S_{FB-H}$ for presentation via haptic actuator, e.g. the haptic wristband 122 and a third feedback driver 223 may be configured to generate the visual signal $S_{FB-V}$ for presentation via display, e.g. 115, 115R, and/or 115L.

Preferably, an intensity of the at least one first sensory stimulus reflects a distance, say $d_1$, to a first surface element of an object 141 intersecting a straight line between the eye-base line of the subject U and the estimated point of regard $PoR_1$. Here, the first surface element is located closer to the eye-base line than any other surface element of the objects in the surrounding environment along said straight line. In other words, the estimated point of regard $PoR_1$ "sees" objects in a manner corresponding to how the sense of sight functions for a person with normal eyesight. To provide an intuitive user experience, it is preferable that the intensity of the at least one first sensory stimulus is relatively high for a comparatively short distance, and relatively low for a comparatively long distance. For example a volume of sound generated in the headphone 121 may be stronger when the subject's U estimated point of regard $PoR_1$ is located on the first object 141 at the first distance $d_1$ than when the subject's U estimated point of regard $PoR_2$ is located on the second object 142 at the second distance $d_2$ because the second distance $d_2$ is longer than the first distance $d_1$. Analogously, a haptic force and/or haptic frequency generated by the haptic wristband 122 may be stronger/higher when the subject's U estimated point of regard $PoR_1$ is located on the first object 141 than when the subject's U estimated point of regard $PoR_2$ is located on the second object 142. Alternatively, or in addition thereto, a visual signal $S_{FB-V}$ may be generated, which visual signal $S_{FB-V}$ illustrates the differences in distance between $d_1$ and $d_2$. For instance, the somewhat shorter distance $d_1$ to the first object 141 may be illustrated via the display 115R, 115L and/or 115 being more brightly illuminated and/or showing a pattern with higher contrast than when the estimated point of regard $PoR_2$ is positioned at the second object 142 at the longer distance $d_2$.

If the distance sensor 130 contains an image registering means, for example an electronic sensor based on CCD (charge-coupled device) or CMOS (complementary metal-oxide-semiconductor) technology, the spatial data $D_{spat}$ may further describe light intensity and/or color information reflected from the objects 141, 142 and 143 in the surrounding environment. If such image-related information is available in the spatial data $D_{spat}$, the processing circuitry 210 is preferably configured to obtain at least one visual quality of at least one of said objects from the spatial data $D_{spat}$. The processing circuitry 210 is preferably further configured to generate the feedback signal $S_{FB}$, such that it further reflects the at least one visual quality. For example, the at least one visual quality may express a color, a surface texture and/or an object class.

Here, the feedback signal $S_{FB}$ may reflect the at least one visual quality by causing at least one second sensory stimulus to be applied to the subject U, i.e. a stimulus that is different from the at least one first sensory stimulus. This means that if for example the first sensory stimulus is a haptic feedback produced by the haptic wristband 122, the second sensory stimulus may be acoustic feedback generated by the headphone 121, preferably in parallel with the haptic feedback. For instance, while the haptic feedback illustrates the second distance $d_2$ to the second object 142, the headphone 121 may present an audio message saying: "shiny blue" to the subject U. The object class may express a categorization of any object detected at the estimated point of regard, for example by employing an image processing matching algorithm in the processing circuitry 210. Consequently, provided that the second object 142 has been categorized to belong to an object class "cups", the headphone 121 may feedback a second sensory stimulus in the form of an audio message saying: "shiny blue cup."

Figure 3:
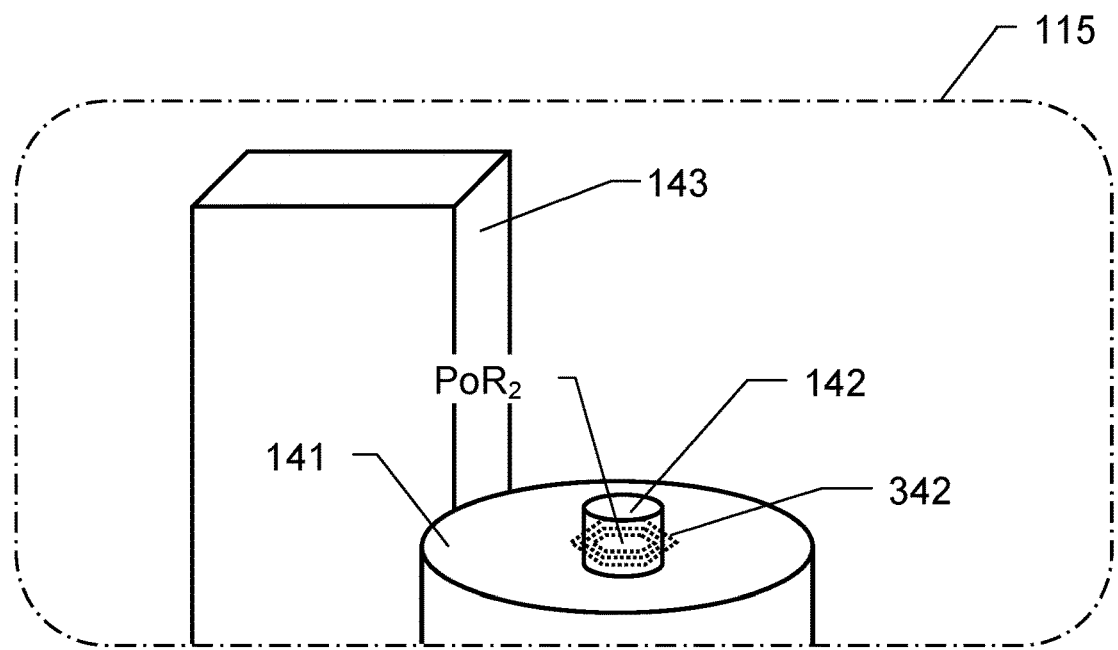
FIG. 3 illustrates how an ocular cue is presented to a subject as a confirmation of the subject's point of regard according to one embodiment of the invention.

FIG. 3 illustrates one embodiment of the invention, wherein an ocular cue 342 is presented to the subject U as a confirmation of the subject's U point of regard $PoR_2$ on the object 142. Here, the processing circuitry 210 is configured to cause the output interface 213 to deliver a visual signal $S_{FB-V}$ for presentation on at least one display 115R, 115L and/or 115, which visual signal $S_{FB-V}$ provides the ocular cue 342 to the subject U. The ocular cue 342 may be represented by at least one graphical element that is shown in a field of view for the subject U at such a position that the at least one graphical element superimposes the estimated point of regard $PoR_2$. In FIG. 3, field of view is outlined as a physical extension of the display 115.

Figure 4:
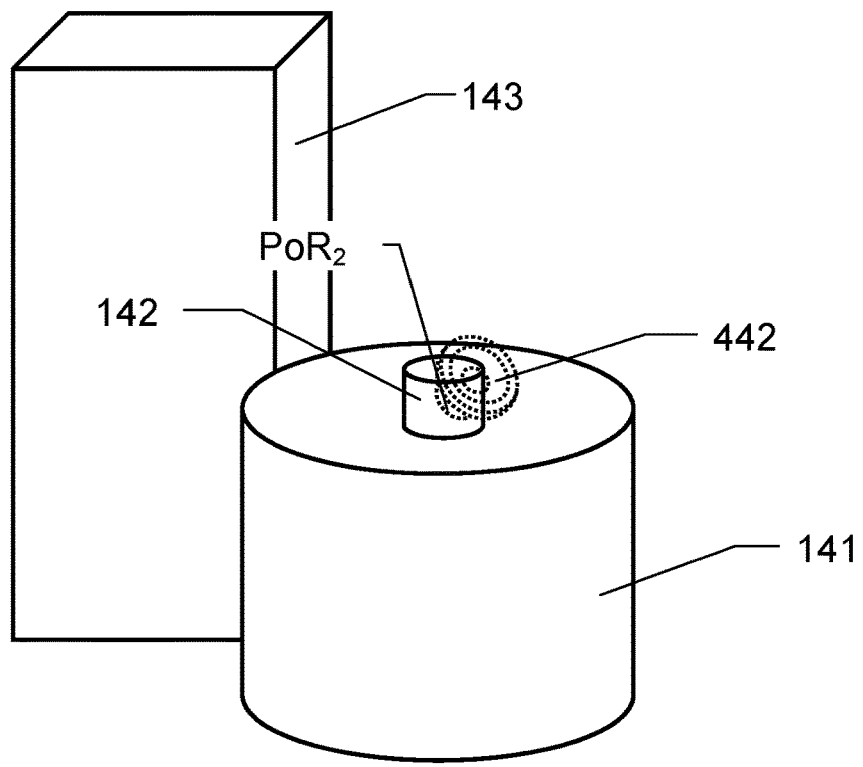
FIG. 4 illustrates how an acoustic signal is presented to a subject as a confirmation of the subject's point of regard according to one embodiment of the invention.

In FIG. 4, we see another example of how a cue may be presented to the subject U according to one embodiment of the invention. Here, the processing circuitry 210 is configured to cause an acoustic signal $S_{FB-A}$ to be generated as a confirmation of the subject's U point of regard $PoR_2$ on the object 142. More precisely, via the output interface 213, the first feedback driver 221 causes a connected one speaker 121 to generate an acoustic signal $S_{FB-A}$ which provides a sound cue to the subject U. The sound cue confirms a position for the estimated point of regard $PoR_2$ at the object 142. Preferably, in order to assist a visually impaired or blind person to position the object 142 adequately, the sound cue simulates an acoustic source 442 that is located at the estimated point of regard $PoR_2$ by using three-dimensional positional audio effects. The sound source 442, in turn, may for example produce a repeating ping, or a continuous tone.

Figure 5:
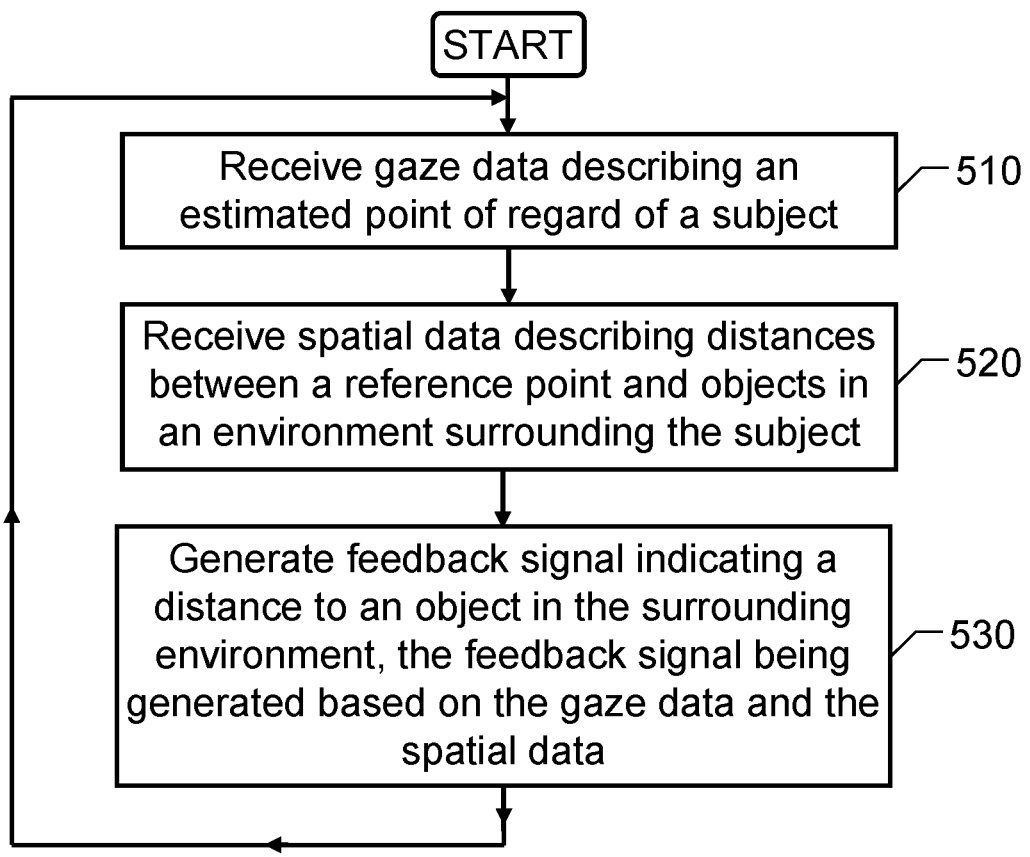
FIG. 5 illustrates, by means of a flow diagram, the general method according to the invention.

In order to sum up, and with reference to the flow diagram in FIG. 5, we will now describe the general method according to the invention for assisting a subject to acquire spatial information about a surrounding environment.

In a first step 510, gaze data are received that describe an estimated point of regard of the subject. In a subsequent, or more preferably, parallel, step 520; spatial data are received that describe respective distances between a reference point and objects in the surrounding environment.

Then, in a step 530, a feedback signal is generated for presentation to the subject. The feedback signal is generated based on the estimated point of regard and the spatial data. The feedback signal indicates a distance from the subject to an object of said objects in the surrounding environment. Preferably, the feedback signal indicates the distance to a surface element of an object intersecting a straight line between an eye-base line of the subject and the estimated point of regard, where said surface element is located closer to the eye-base line than any other surface element along said straight line.

Thereafter, the procedure loops back to steps 510 and 520 again.

All of the process steps, as well as any sub-sequence of steps, described with reference to FIG. 5 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method performed in a processing circuitry for assisting a subject to acquire spatial information about a surrounding environment, comprising:
   receiving gaze data describing an estimated point of regard of the subject;
   receiving spatial data describing a distance between a reference point and an object in the surrounding environment;
   generating a feedback signal for presentation to the subject, which feedback signal is generated based on the estimated point of regard and the spatial data, the feedback signal indicating a distance from the subject to said object in the surrounding environment; and
   wherein the feedback signal is configured to cause at least one first sensory stimulus to be applied to the subject in a form of at least one of: an acoustic signal, a haptic signal and a visual signal,
   wherein generating the feedback signal comprises presenting a visual signal providing an ocular cue to the subject confirming a position for the estimated point of regard at a particular object of said objects in the surrounding environment, the ocular cue being represented by at least one graphical element shown in a field of view for the subject at such a position that the at least one graphical element superimposes the estimated point of regard.

2. The method according to claim 1, wherein the feedback signal indicates a movement of said object relative to the subject.

3. The method according to claim 1, wherein an intensity of the at least one first sensory stimulus reflects a distance to a first surface element of an object intersecting a straight line between an eye-base line of the subject and the estimated point of regard, which first surface element is located closer to the eye-base line than any other surface element of the objects in the surrounding environment along said straight line.

4. The method according to claim 3, wherein the intensity is relatively high for a comparatively short distance, and relatively low for a comparatively long distance.

5. The method according to claim 3, wherein the reference point is located on the eye-base line.

6. The method according to claim 3, wherein the reference point is located at a geometric center of a head mountable arrangement that incorporates an eyetracker configured to generate the gaze data, the geometric center representing an estimated point around which the head mountable arrangement is rotated when mounted on the subject.

7. The method according to claim 1, wherein the spatial data describes color and light intensity information reflected from at least one object in the surrounding environment, and the method comprises:
   obtaining at least one visual quality of at least one of said at least one object from the spatial data; and
   generating the feedback signal such that it reflects said at least one visual quality.

8. The method according to claim 7, wherein the at least one visual quality comprises at least one of a color, a surface texture and an object class describing said at least one object, and the feedback signal is configured to cause at least one second sensory stimulus to be applied to the subject, which at least one second sensory stimulus reflects at least one of the color, the surface texture and the object class and is different from the at least one first stimulus.

9. The method according to claim 1, wherein generating the feedback signal comprises presenting an acoustic signal to the subject, which acoustic signal provides a sound cue confirming a position for the estimated point of regard at a particular object of said objects in the surrounding environment, the sound cue simulating an acoustic source located at the estimated point of regard via three-dimensional positional audio effects.

10. A processing circuitry configured to be included in a head mountable arrangement for assisting a subject to acquire spatial information about a surrounding environment, the processing circuitry comprising:
    a first input interface configured to receive gaze data from an eyetracker, which gaze data describe an estimated point of regard of the subject;
    a second input interface configured to receive spatial data describing a distance between a reference point and an object in the surrounding environment;
    an output interface configured to provide a feedback signal indicating a distance from the subject to said object in the surrounding environment, the feedback signal being generated based on the estimated point of regard and the spatial data; and
    wherein the output interface is configured to generate the feedback signal to cause at least one first sensory stimulus to be applied to the subject in a form of at least one of: an acoustic signal, a haptic signal and a visual signal,
    wherein the output interface is configured to be connected to at least one display configured to present a visual signal to the subject, which visual signal provides an ocular cue confirming a position for the estimated point of regard at a particular object of said objects in the surrounding environment, the ocular cue being represented by at least one graphical element shown in a field of view for the subject at such a position that the at least one graphical element superimposes the estimated point of regard.

11. The processing circuitry according to claim 10, wherein the feedback signal indicates a movement of said object relative to the subject.

12. The processing circuitry according to claim 11, wherein the output interface is configured to be connected to at least one speaker configured to generate an acoustic signal to the subject, which acoustic signal provides a sound cue confirming a position for the estimated point of regard at a particular object of said objects in the surrounding environment, the sound cue simulating an acoustic source located at the estimated point of regard via three-dimensional positional audio effects.

13. The processing circuitry according to claim 10, wherein the output interface is configured to generate the feedback signal such that an intensity of the at least one first sensory stimulus reflects a distance to a first surface element of an object intersecting a straight line between an eye-base line of the subject and the estimated point of regard, which first surface element is located closer to the eye-base line than any other surface element of objects in the surrounding environment along said straight line.

14. The processing circuitry according to claim 10, wherein the reference point is located at a geometric center of a head mountable arrangement that incorporates an eyetracker configured to generate the gaze data, the geometric center representing an estimated point around which the head mountable arrangement is rotated when mounted on the subject.

15. The processing circuitry according to claim 10, wherein the spatial data describes color and light intensity information reflected from objects in the surrounding environment, and the processing circuitry is configured to:
   obtain at least one visual quality of at least one of said objects from the spatial data; and generate the feedback signal such that it reflects said at least one visual quality.

16. The processing circuitry according to claim 15, wherein the at least one visual quality comprises at least one of a color, a surface texture and an object class describing said at least one object, and the output interface is configured to provide the feedback signal to cause at least one second sensory stimulus to be applied to the subject, which at least one second sensory stimulus reflects at least one of the color, the surface texture and the object class and is different from the at least one first stimulus.

\* \* \* \* \*